United States Patent [19]
Mizuno et al.

[11] Patent Number: 6,074,280
[45] Date of Patent: Jun. 13, 2000

[54] EYEGLASS LENS GRINDING APPARATUS AND A METHOD OF GRINDING AN EYEGLASS

[75] Inventors: Toshiaki Mizuno; Hirokatsu Obayashi; Ryoji Shibata, all of Aichi, Japan

[73] Assignee: Nidek Co., Ltd., Aichi, Japan

[21] Appl. No.: 09/157,310

[22] Filed: Sep. 21, 1998

[30] Foreign Application Priority Data

Sep. 24, 1997 [JP] Japan .................................. 9-278037

[51] Int. Cl.$^7$ ...................................................... B24B 7/24
[52] U.S. Cl. ............................................................ 451/42
[58] Field of Search .................................. 451/5, 14, 43, 451/53, 209, 210, 255, 256, 450, 42, 41

[56] References Cited

U.S. PATENT DOCUMENTS

| | | | |
|---|---|---|---|
| 4,197,678 | 4/1980 | Roll et al. ................................... | 51/267 |
| 4,286,415 | 9/1981 | Loreto .................................... | 51/284 E |
| 4,885,875 | 12/1989 | Soper .................................... | 51/284 E |
| 4,908,996 | 3/1990 | Friedman et al. ..................... | 51/284 R |
| 5,056,270 | 10/1991 | Curcher ................................. | 51/284 E |
| 5,138,770 | 8/1992 | Matsuyama ................................. | 33/28 |
| 5,148,637 | 9/1992 | Byron .................................... | 51/165.71 |
| 5,228,242 | 7/1993 | Matsuyama .......................... | 51/165.74 |
| 5,333,412 | 8/1994 | Matsuyama .......................... | 51/165.71 |
| 5,347,762 | 9/1994 | Shibata et al. ............................ | 451/15 |
| 5,410,843 | 5/1995 | Gottschald ................................ | 450/43 |
| 5,711,700 | 1/1998 | Raffaelli .................................... | 451/43 |
| 5,716,256 | 2/1998 | Mizuno et al. ............................ | 451/5 |
| 5,775,973 | 7/1998 | Watanabe .................................... | 451/5 |

FOREIGN PATENT DOCUMENTS 3-20603  1/1991  Japan .................................. G01B 5/06

*Primary Examiner*—Rodney A. Butler
*Attorney, Agent, or Firm*—Sughrue, Mion, Zinn, Macpeak & Seas, PLLC

[57] ABSTRACT

In an eyeglass lens grinding apparatus, a material and a process condition of an eyeglass lens to be processed is input. A grinding wheel for grinding the lens is rotated at a variable rotational speed. That is, the lens is processed while variably changing the rotational speed of the grinding wheel in accordance with a preset value of the rotational speed of the grinding wheel based on the input material or a process condition of the lens. The processing, time period can be shortened and the quality of the process face can be improved.

9 Claims, 9 Drawing Sheets

|  | GLASS | PLASTIC | POLYCARBONATE |
|---|---|---|---|
| ROUGH PROCESS | MEDIUM SPEED (6,000rpm) | HIGH SPEED (7,600rpm) | HIGH SPEED (7,600rpm) |
| FINISHING PROCESS | MEDIUM SPEED (6,000rpm) | HIGH SPEED (7,600rpm) | HIGH SPEED (7,600rpm) |
| MIRROR-POLISHING PROCESS |  | LOW SPEED (4,000rpm) | FIRST PROCESS LOW SPEED (4,000rpm) SECOND PROCESS HIGH SPEED (7,600rpm) |

FIG. 10

[PARAMETER]
⋮

ROTATIONAL SPEED OF ROUGH WHEEL (PLASTIC, POLYCARBONATE)   7600
ROTATIONAL SPEED OF ROUGH WHEEL (GLASS)   6000
ROTATIONAL SPEED OF FINISHING WHEEL (PLASTIC, POLYCARBONATE)   7600
ROTATIONAL SPEED OF FINISHING WHEEL (GLASS)   6000
→ROTATIONAL SPEED OF MIRROR-POLISHING WHEEL (PLASTIC)   4000
ROTATIONAL SPEED OF MIRROR-POLISHING WHEEL (POLYCARBONATE) [DRY]   4000
ROTATIONAL SPEED OF MIRROR-POLISHING WHEEL (POLYCARBONATE) [WET]   7600
⋮

[NEXT]

ND A METHOD OF GRINDING AN
EYEGLASS LENS GRINDING APPARATUS AND A METHOD OF GRINDING AN EYEGLASS

BACKGROUND OF THE INVENTION

The present invention relates to an eyeglass lens grinding apparatus which grinds an eyeglass lens so that the lens fits into an eyeglass frame, and also to a method for the same.

An eyeglass lens grinding apparatus is known in which a distance between the rotary shaft holding a subject lens and each of rotary shafts of grinding wheels rotated by motors is changed so that the subject lens is processed with pressing an edge of the lens against the grinding wheels suitable for the intended process, such as a rough grinding wheel, a finishing grinding wheel, and a mirror-polishing grinding wheel. As the motors for rotating the grinding wheels, used are AC motors in which the rotational speed cannot be changed. Therefore, the rotational speed of each grinding wheel is always constant.

When the rotational speed of each grinding wheel is constant, however, there arise the following problems. In rough and finishing processes for a plastic lens, for example, as the rotational speed of a grinding wheel is higher, the grinding amount can be made larger so that the processing time period is shorter. In contrast, in a mirror-polishing process, when the rotational speed of the grinding wheel is too high, grinding heat is excessively generated, and hence the process surface is easily burned. Furthermore, the surface is hardened and the mirror-polishing process is hardly performed on the surface.

In a mirror-polishing process of a lens made of polycarbonate which is a thermoplastic-material, because of the properties of the material, a rough process, a finishing process, and a mirror-polishing process using a mirror-polishing grinding wheel are performed while not supplying a grinding fluid, and thereafter the grinding fluid is finally supplied so as to give a gloss. In the stage of the mirror-polishing process which is performed without supplying the grinding fluid, when the rotational speed of the grinding wheel is high, grinding heat is excessively generated and the process face melts. Consequently, the quality of the process face is lowered. In contrast, in a mirror-finishing process stage in which the mirror-finishing process is performed while supplying the grinding fluid, when the rotational speed of the grinding wheel is too low, the friction heat in the process face is deficiently generated and hence the process face is not softened. As a result, the process face cannot be processed.

When a process for a glass lens using a rough grinding wheel or a finishing grinding wheel is performed at a high rotational speed in the same manner as the case of a plastic lens, grinding heat is excessively generated and hence the lens easily cracks or breaks.

SUMMARY OF THE INVENTION

In view of the problems of the prior art apparatus, it is an object of the invention to provide an eyeglass lens grinding apparatus, an eyeglass lens grinding method and a system for controlling an eyeglass lens grinding apparatus, which can shorten the processing time period and improve the quality of the process face, and can perform an appropriate grinding process.

In order to attain the object, the invention is characterized in that the invention has the following configuration.

(1) An eyeglass lens grinding apparatus for grinding an eyeglass lens so that the lens fits into an eyeglass frame, the apparatus comprising:

material inputting means for inputting a material of the lens;

process condition inputting means for inputting a process condition of the lens;

grinding wheel rotating means for rotating a grinding wheel for grinding the subject lens, at a variable rotational speed; and process controlling means for processing the lens while variably changing the rotational speed of the grinding wheel through the grinding wheel rotating means, in accordance with a preset value of the rotational speed of the grinding wheel based on the input material or the input process condition of the lens.

(2) An eyeglass lens grinding apparatus as set forth in (1), wherein the grinding wheel rotating means has a rough grinding wheel, a finishing grinding wheel, and a mirror-polishing grinding wheel, and, when a condition of a mirror-polishing process is input through the process condition inputting means, the process controlling means processes the lens while controlling an operation of the grinding wheel rotating means so that the mirror-polishing grinding wheel is rotated at a speed which is lower than a rotational speed of the rough grinding wheel or the finishing grinding wheel.

(3) An eyeglass lens grinding apparatus as set forth in (1), further comprising:

grinding fluid supplying means for supplying a grinding fluid to a process face of the lens;

wherein the grinding wheel rotating means has a rough grinding wheel, a finishing grinding wheel, and a mirror-polishing grinding wheel, and, when a polycarbonate material is input through the material inputting means and a condition of a mirror-polishing process is input through the process condition inputting means, the process controlling means controls the grinding fluid supplying means and the grinding wheel rotating means during the mirror-polishing process such that a first mirror-polishing process is performed while rotating the mirror-polishing grinding wheel at a predetermined first rotational speed and not supplying the grinding fluid, and a second mirror-polishing process is then performed while rotating the mirror-polishing grinding wheel at a second rotational speed and supplying the grinding fluid, the second rotational speed being higher than the first rotational speed.

(4) An eyeglass lens grinding apparatus as set forth in (3), wherein the process controlling means controls the grinding wheel rotating means such that the rough grinding wheel and the finishing grinding wheel are rotated at a third rotational speed substantially equal to the second rotational speed during a rough process and a finishing process.

(5) An eyeglass lens grinding apparatus as set forth in (3), wherein the first rotational speed is substantially one half of the second rotational speed.

(6) An eyeglass lens grinding apparatus as set forth in (1), wherein when a glass material is input through the material inputting means, the process controlling means controls an operation of the grinding wheel rotating means such that the grinding wheel is rotated at a rotational speed which is lower than a rotational speed of the grinding wheel in a case where a plastic material is input.

(7) An eyeglass lens grinding apparatus as set forth in (1), further comprising:

set value changing means for changing a set value of the rotational speed of the grinding wheel by the grinding wheel rotating means, in accordance with the material or the process condition of the subject lens.

(8) A method of grinding an eyeglass lens so that the lens fits into an eyeglass frame, comprising:

a first step of inputting a material of the lens;

a second step of inputting a process condition of the lens; and a third step of processing the lens while changing a rotational speed of a grinding wheel for grinding the lens, on the basis of the input of the first step or the second step.

(9) A method of grinding an eyeglass lens as set forth in (8), wherein when a polycarbonate material is input in the first step and a condition of a mirror-polishing process is input in the second step, the third step includes:

a fourth step of performing a rough process on the lens while rotating a rough grinding wheel at a first rotational speed;

a fifth step of performing a finishing process on the lens which has undergone the rough process, while rotating a finishing grinding wheel at a second rotational speed;

a sixth step of performing a mirror-polishing process on the lens which has undergone the finishing process, while rotating a mirror-polishing grinding wheel at a third rotational speed; and a seventh step of performing a mirror-polishing process on the lens which has undergone the process of the sixth step, while rotating the mirror-polishing grinding wheel at a fourth rotational speed and supplying a grinding fluid, and wherein the third rotational speed is lower than each of the first, second, and fourth rotational speeds.

(10) A system for operating an eyeglass lens grinding apparatus to grind an eyeglass lens so that the lens fits into an eyeglass frame, the system comprising:

a memory containing therein a program for executing a method including:

a first step of inputting a material of the lens;

a second step of inputting a process condition of the lens; and a third step of processing the lens while changing a rotational speed of a grinding wheel for grinding the lens, on the basis of the input of the first step or the second step; and a control unit for controlling the eyeglass lens grinding apparatus in accordance with the program.

(11) A system according to claim 10, wherein when a polycarbonate material is input in the first step and a condition of a mirror-polishing process is input in the second step, the third step includes:

a fourth step of performing a rough process on the lens while rotating a rough grinding wheel at a first rotational speed;

a fifth step of performing a finishing process on the lens which has undergone the rough process, while rotating a finishing grinding wheel at a second rotational speed;

a sixth step of performing a mirror-polishing process on the lens which has undergone the finishing process, while rotating a mirror-polishing grinding wheel at a third rotational speed lower than each of the first and second rotational speeds; and a seventh step of performing a mirror-polishing process on the lens which has undergone the process of the sixth step, while rotating the mirror-polishing grinding wheel at a fourth rotational speed higher than the third rotational speed and supplying a grinding fluid.

The present disclosure relates to the subject matter contained in Japanese patent application No. Hei. 9-278037 (filed on Sep. 24, 1998), which is expressly incorporated herein by reference in its entirety.

DESCRIPTION OF THE PREFERRED EMBODIMENT

A lens grinding apparatus according to an embodiment of the present invention will be hereinafter described with reference to the accompanying drawings.

Configuration of Whole Apparatus

Figure 1:
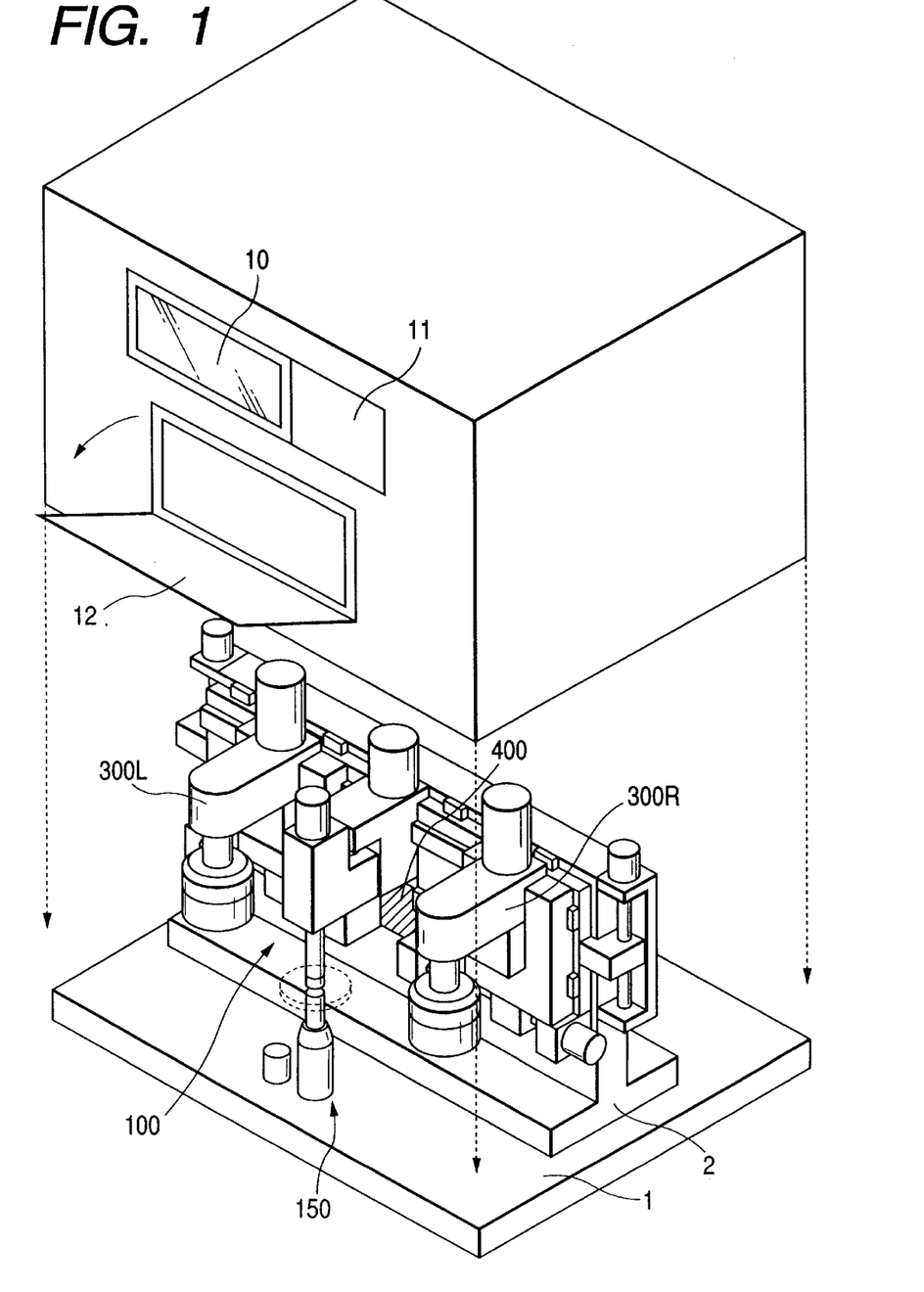
FIG. 1 is a view showing the entire configuration of an apparatus of an embodiment.

In FIG. 1, reference numeral 1 denotes a main base, and 2 denotes a sub-base that is fixed to the main base 1. A lens chuck upper part 100 and a lens chuck lower part 150 hold a lens to be processed by means of their respective chuck shafts during processing it. A lens thickness measuring section 400 is accommodated below the lens chuck upper part 100 in the depth of the sub-base 2.

Figure 2:
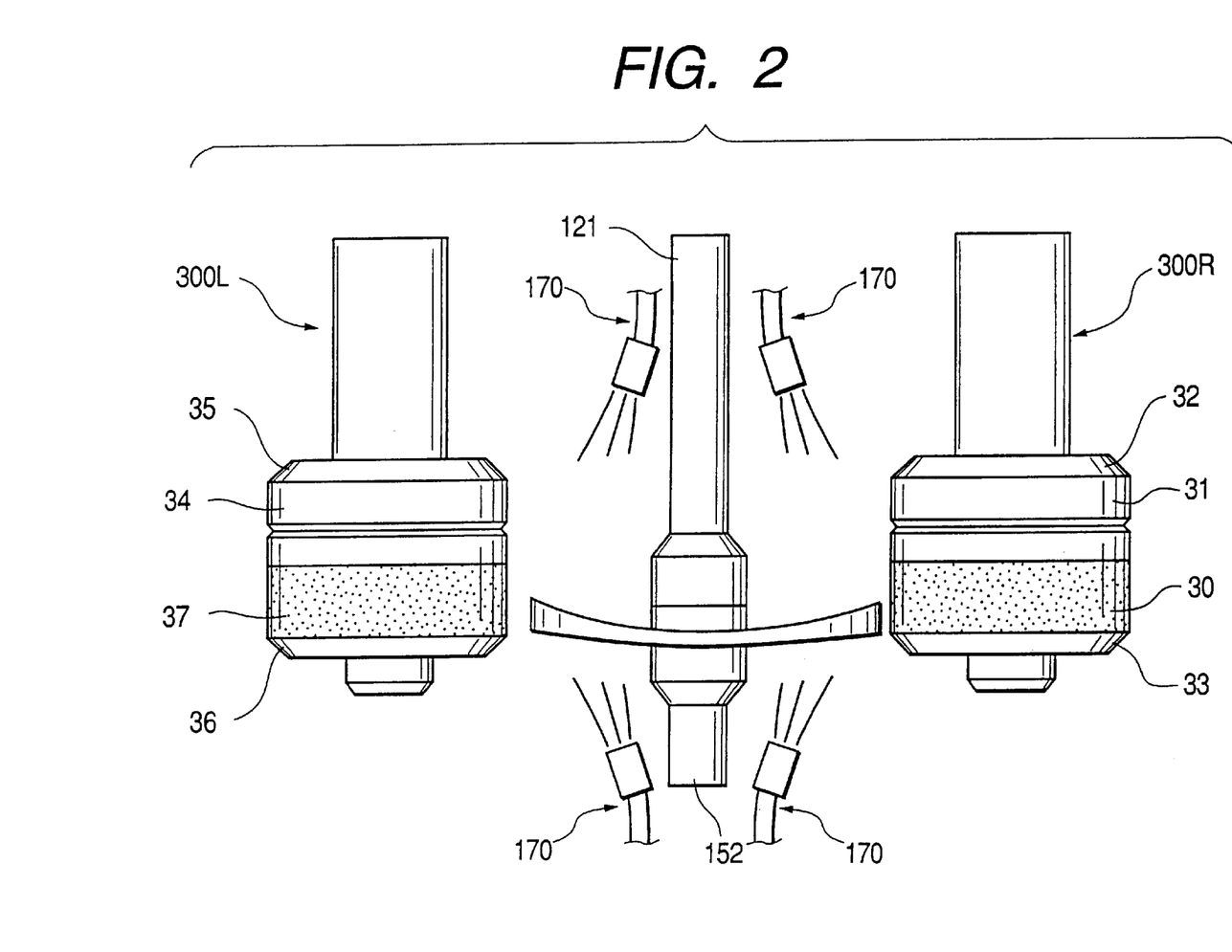
FIG. 2 is a view showing the configuration of grinding wheels and nozzles for ejecting a grinding fluid.

Reference symbols 300R and 300L respectively represent right and left lens grinding parts each having grinding wheels for lens grinding on its rotary shaft. Each of the lens grinding parts 300R and 300L is held by a moving mechanism (described later) so as to be movable in the vertical and horizontal directions with respect the sub-base 2. As shown in FIG. 2, a rough grinding wheel 30 for processing on plastic, polycarbonate and acrylic lenses, and a finishing grinding wheel 31 having a bevel groove are mounted on the rotary shaft of the lens grinding part 300R. Further, a front surface chamfering grinding wheel 32 having a conical surface is coaxially attached to the upper end surface of the finishing grinding wheel 31, while a rear surface chamfering grinding wheel 33 having a conical surface is coaxially attached to the lower end surface of the rough grinding wheel 30. On the other hand, a rough grinding wheel 37 for processing on a glass lens, a mirror-finishing (polishing) grinding wheel 34 having a bevel groove, a front surface mirror-chamfering grinding wheel 35 having a conical surface, and a rear surface mirror-chamfering grinding wheel 36 having a conical surface are coaxially mounted on the rotary shaft of the lens grinding part 300L. The diameter of these grinding wheels are relatively small, that is, about 60 mm, thereby improving processing accuracy while ensuring durability of the grinding wheels.

In FIG. 2, reference numeral 170 designates a nozzle for ejecting grinding water onto a lens to be processed.

A display unit 10 for displaying processing data and other information and an input unit 11 for allowing a user to input data or an instruction to the lens grinding apparatus are provided in the front surface of a body of the apparatus. Reference numeral 12 denotes a closable door.

Structures of Main Parts

<Lens Chuck Part>

Figure 3:
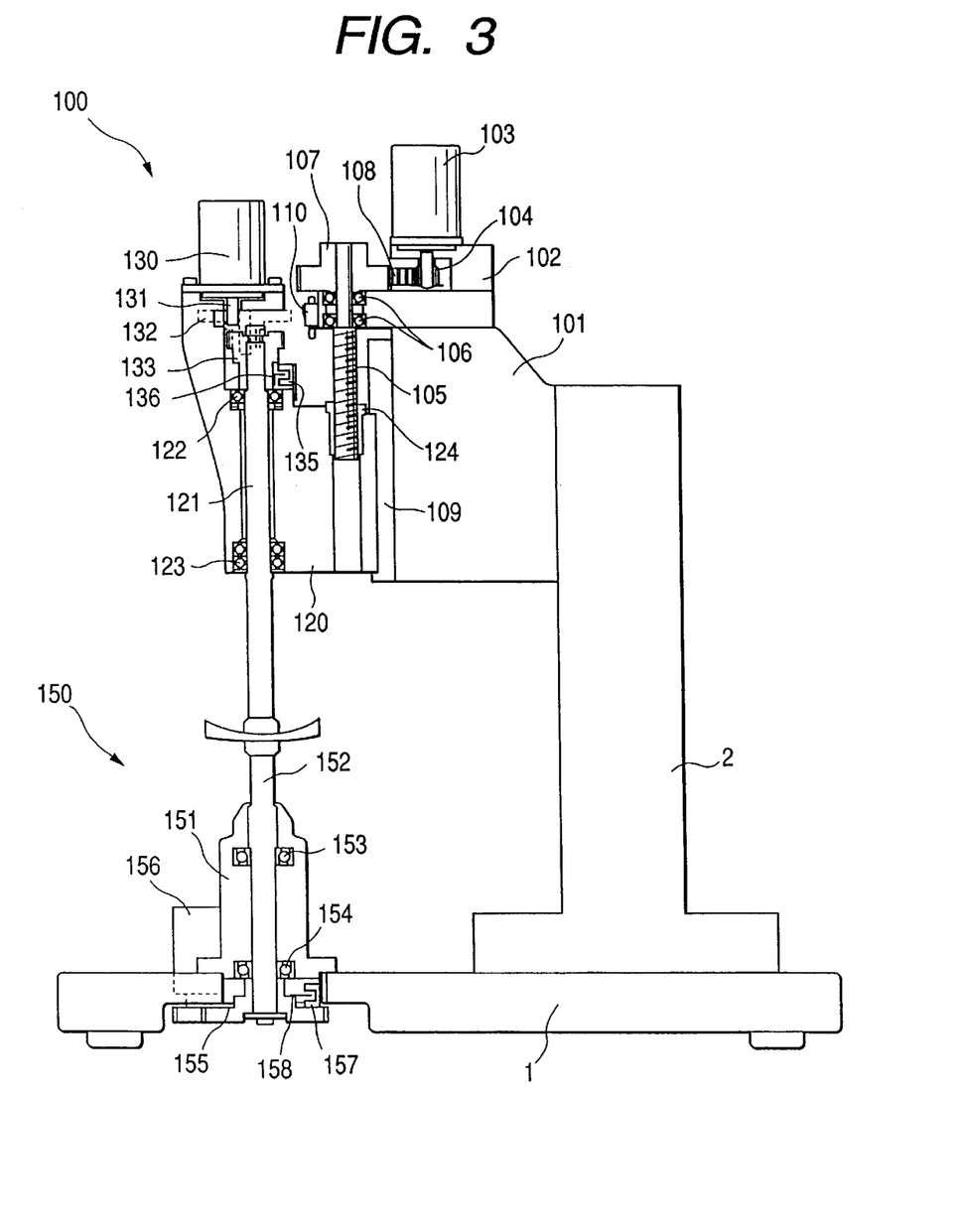
FIG. 3 is a view illustrating the configuration of a lens chuck upper part and a lens chuck lower part.

FIG. 3 illustrates the lens chuck upper part 100 and the lens chuck lower part 150. A fixing block 101 is fixed to the sub-base 2. A DC motor 103 is mounted on top of the fixing block 101 by means of a mounting plate 102. The rotational force of the DC motor 103 is transmitted through a pulley 104, a timing belt 108 and a pulley 107 to a feed screw 105.

The feed screw 105 is rotatably held by the fixing block 101 through a bearing 106. A chuck shaft 121 is rotatably held by a chuck shaft holder 120 through bearings 122 and 123. A nut 124 that is threadedly engaged with the feed screw 105 is fixed to the chuck shaft holder 120. As the feed screw 105 is rotated, the chuck shaft holder 120 is moved vertically, while being guided by a guide rail 109 fixed to the fixing block 101. A micro switch 110, which is attached to the fixing block 101, detects a reference position when the chuck shaft holder 120 is elevated. A pulse motor 130 is fixed to the top portion of the chuck shaft holder 120. The rotational force of the pulse motor 130 is transmitted, via a gear 131, and a relay gear 132 to a gear 133 to rotate the chuck shaft 121. Reference numeral 135 denotes a photosensor and 136 denotes a light-shielding plate that is mounted on the chuck shaft 121. The photosensor 135 detects a rotation reference position of the chuck shaft 121.

A lower chuck shaft 152 is rotatably held by a chuck shaft holder 151 through bearings 153 and 154, and the chuck shaft holder 151 is fixed to the main base 1. The rotational force of a pulse motor 156 is transmitted to the chuck shaft 152 to rotate the chuck shaft 152. Reference numeral 157 denotes a photosensor and 158 denotes a light-shielding plate that is mounted on the gear 155. The photosensor 157 detects a rotation reference position of the chuck shaft 152.

<Moving Mechanism for Lens Grinding Part>

Figure 4:
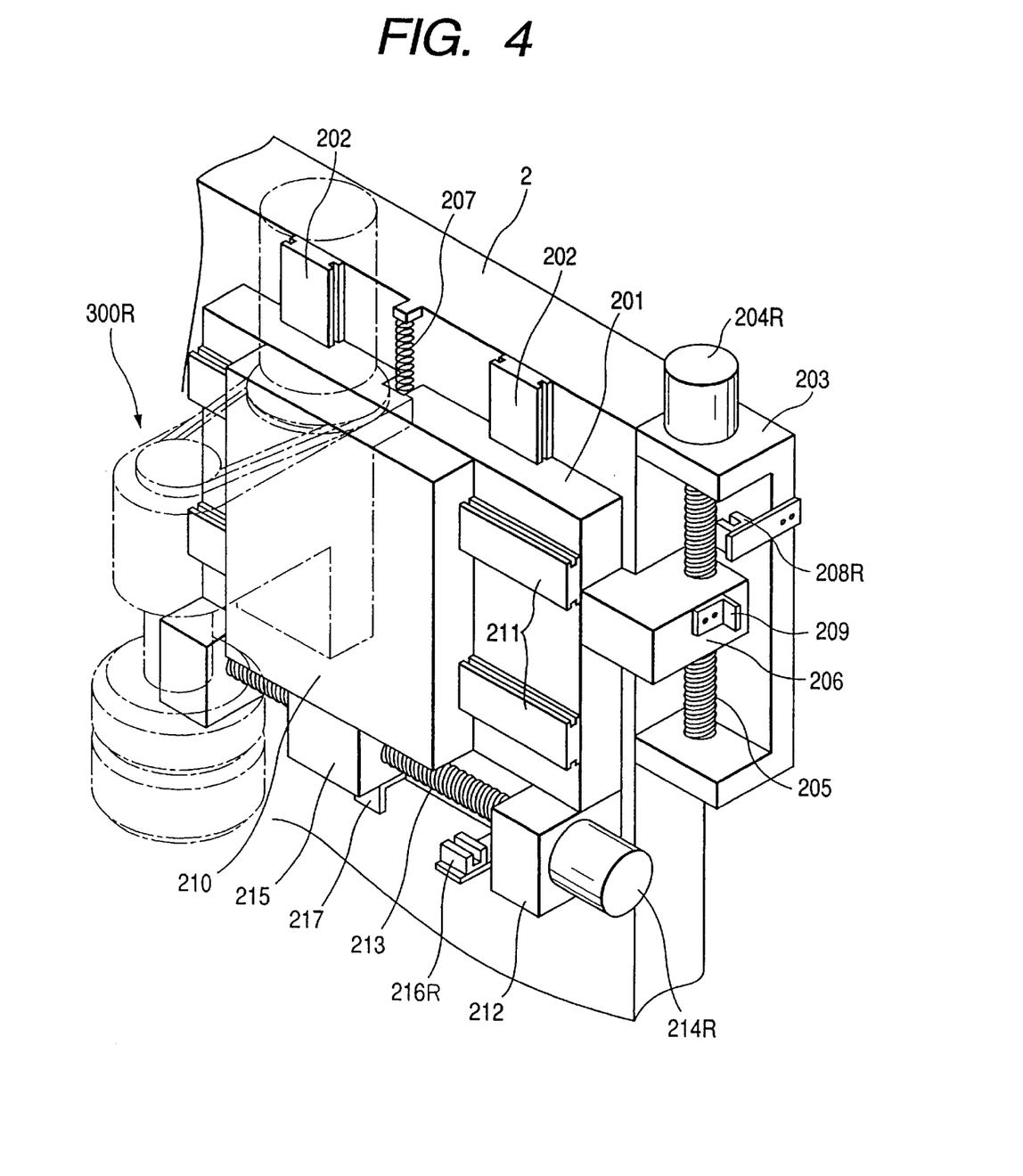
FIG. 4 is a view illustrating a mechanism for moving a lens grinding part 300R.

FIG. 4 illustrates a mechanism for moving the right lens grinding part 300R. A vertical slide base 201 is vertically slidable along two guide rails 202 that are fixed to the front surface of the sub-base 2. A bracket-shaped screw holder 203 is fixed to the side surface of the sub-base 2. A pulse motor 204R is fixed to the upper end of the screw holder 203. A ball screw 205 is coupled to the rotary shaft of the pulse motor 204R, so that the rotation of the ball screw 205 causes the vertical slide base 201 fixed to a nut block 206 to be moved in the vertical direction while being guided by the guide rails 202. A spring 207 is provided between the sub-base 2 and the vertical slide base 201. That is, the spring 207 urges the vertical slide base 201 upward to cancel out the downward load of the vertical slide base 201, thereby facilitating its vertical movement.

Reference numeral 208R designates a photosensor, and 209 designates a light-shielding plate that is fixed to the nut block 206. The photosensor 208R determines a reference position of the vertical movent of the vertical slide base 201 by detecting the position of the light-shielding plate 209.

Figure 5:
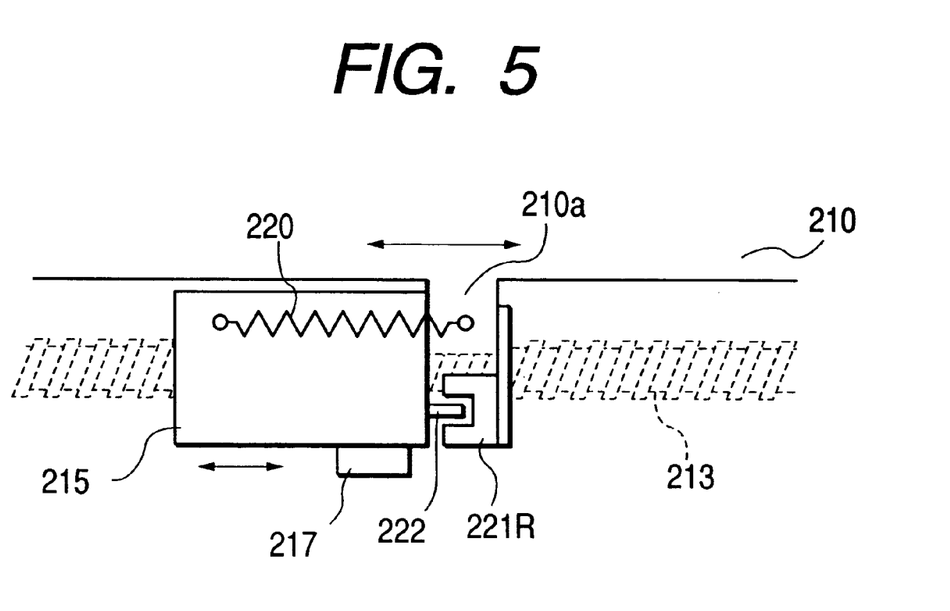
FIG. 5 is a view illustrating a mechanism for laterally moving the lens grinding part 300R and detecting the end of a process.

Reference numeral 210 denotes a horizontal slide base to which the lens grinding part 300R is fixed. The horizontal slide base 210 is slidable in the horizontal direction along two slide guide rails 211 that are fixed to the front surface of the vertical slide base 201. A bracket-shaped screw holder 212 is fixed to the lower end of the vertical slide base 201, and a pulse motor 214R is fixed to the side surface of the screw holder 212. The ball screw 213 is coupled to the rotary shaft of the pulse motor 214R. The ball screw 213 is in threaded engagement with a nut block 215. As shown in FIG. 5, the nut block 215 is connected through a spring 220 to a protruded portion 210a that extends downwardly from the horizontal slide base 210 (note that the mechanism shown in FIG. 5 is located behind the nut block 215 in FIG. 4). The spring 220 biases the horizontal slide base 210 toward the lens chuck side. The rotation of the pulse motor 214R causes the rotation of the ball screw 213, which moves the nut block 215 in the left-handed direction in FIG. 5. The horizontal slide base 210 pulled by the spring 220 is moved in the left-handed direction accordingly. If the grinding pressure larger than the biasing force of the spring 220 is caused during processing of the lens, the horizontal slide base 210 is not moved even through the nut block 215 is moved in the left-handed direction, thereby adjusting the grinding pressure to the lens to be processed. When the nut block 215 is moved in the right-handed direction in FIG. 5, the nut block 215 is pushed by the protruded portion 210a so as to move the horizontal slide base 210 in the right-handed direction. A photosensor 221R is attached to the protruded portion 210a. The photosensor 221R detects the completion of processing upon detecting a light shielding plate 222 fixed to the nut block 215.

A photosensor 216R fixed to the screw holder 212 detects a light-shielding plate 217 fixed to the nut block 215, thereby determining a reference position of the horizontal movement of the horizontal slide base 210.

Since a moving mechanism for the left lens grinding part 300L is symmetrical with that for the right lens grinding part 300R, it will not be described.

<Lens Grinding Part>

Figure 6:
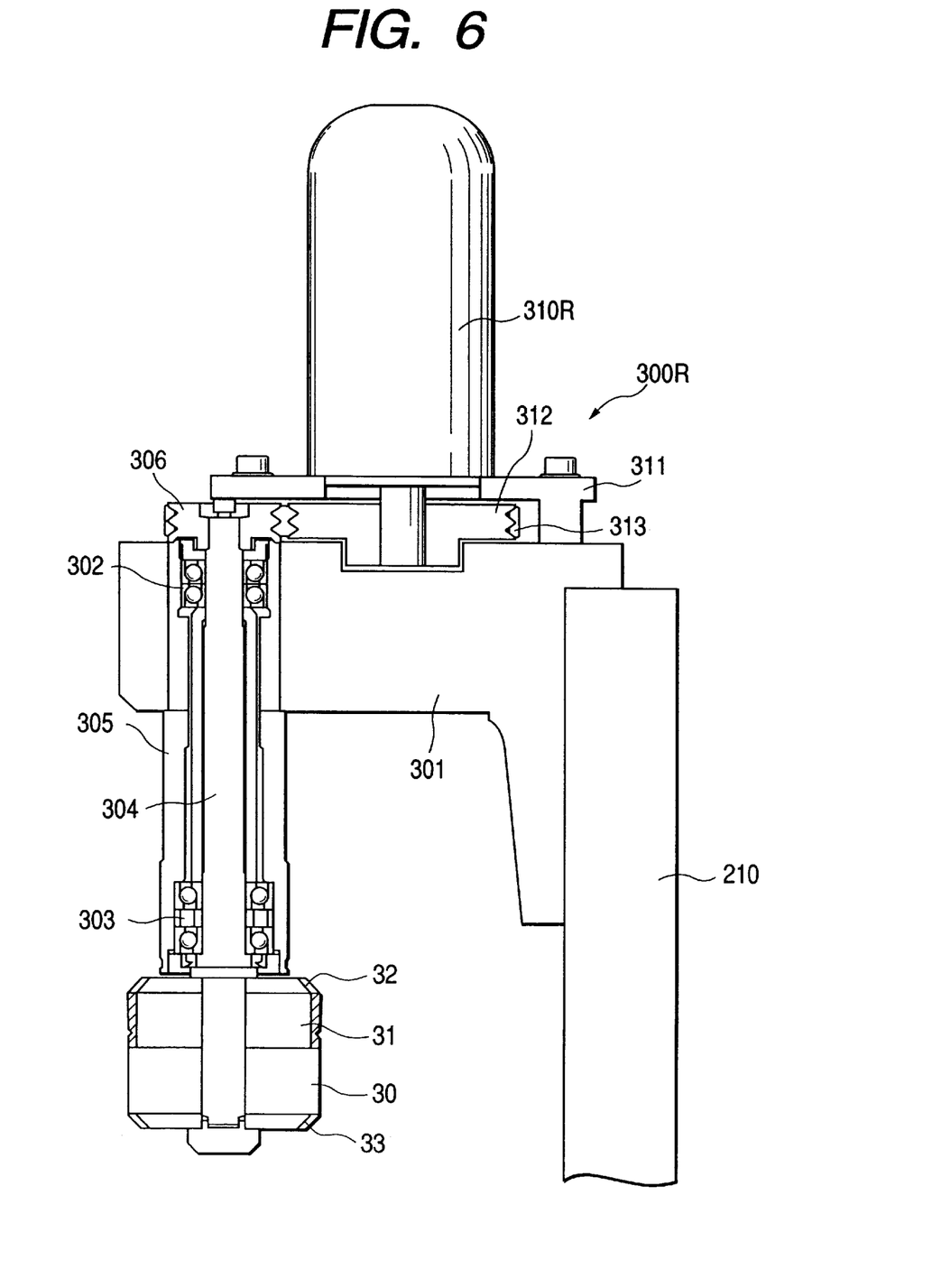
FIG. 6 is a sectional side view showing the configuration of the lens grinding part 300R.

FIG. 6 is a side sectional view showing the structure of the right lens grinding part 300R. A shaft support base 301 is fixed to the horizontal slide base 210. A housing 305 is fixed to the front portion of the shaft support base 301, and rotatably holds therein a vertically extending rotary shaft 304 through bearings 302 and 303. A group of grinding wheels including a rough grinding wheel 30 and so on are mounted on the lower portion of the rotary shaft 304. A servo motor 310R is fixed to the top surface of the shaft support base 301 through a mounting plate 311. The rotational force of the servo motor 310R is transmitted via a pulley 312, a belt 313 and a pulley 306 to the rotary shaft 304, thereby rotating the group of the grinding wheels. Since the servo motor is used to rotate the group of the grinding wheels, the rotation speed thereof can be controlled freely.

Since the left lens grinding part 300L is symmetrical with the right lens grinding part 300R, its structure will not be described.

<Lens Thickness Measuring Section>

Figure 7:
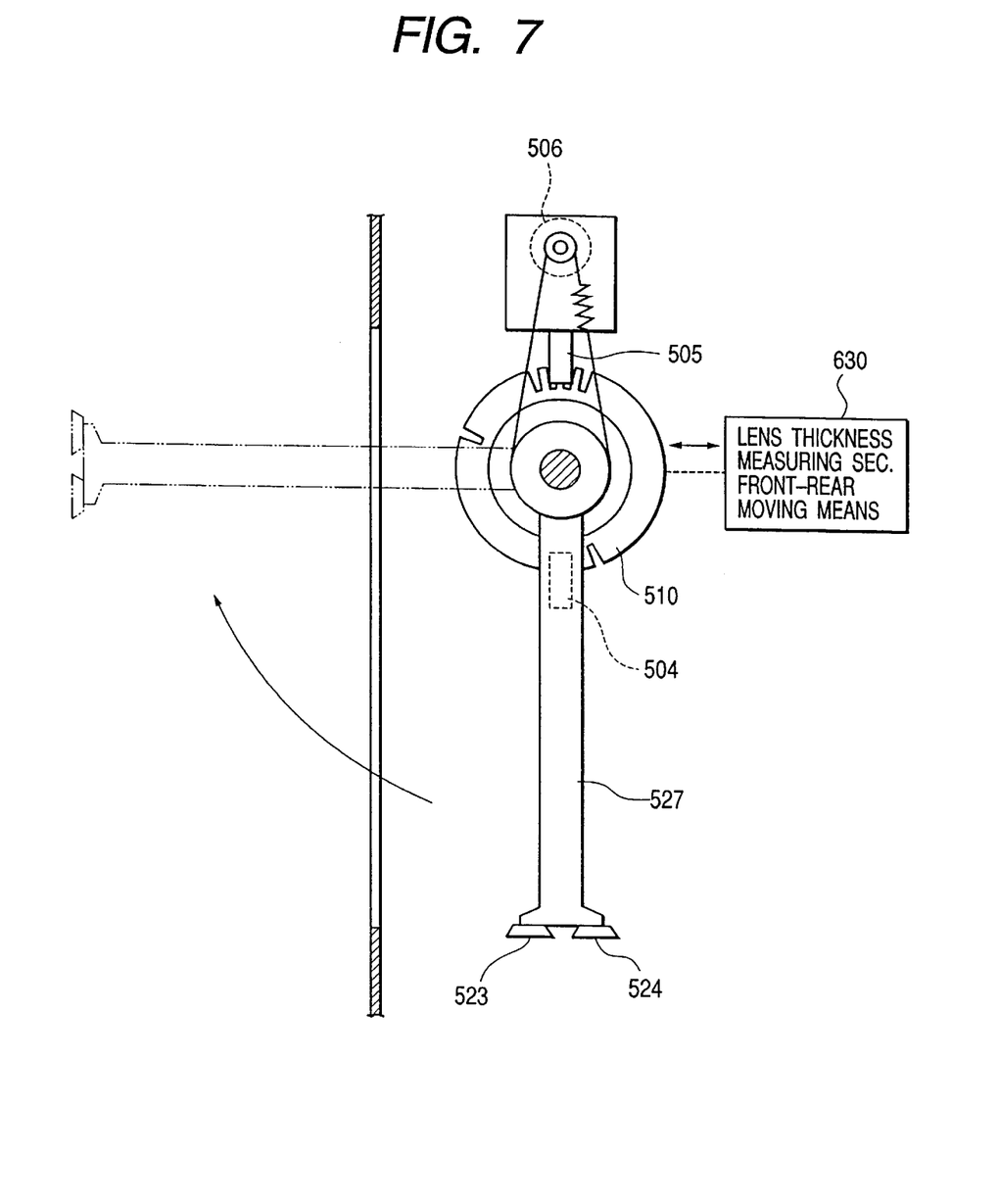
FIG. 7 is a view illustrating a lens thickness measuring section 400.

FIG. 7 illustrates the lens thickness measuring section 400 (FIG. 1). The lens thickness measuring section 400 includes a measuring arm 527 having two feelers 523 and 524, a rotation mechanism such as a DC motor (not shown) for rotating the measuring arm 527, a sensor plate 510 and photo-switches 504 and 505 for detecting the rotation of the measuring arm 527 to thereby allow control of the rotation of the DC motor, a detection mechanism such as a potentiometer 506 for detecting the amount of rotation of the measuring arm 527 to thereby obtain the shapes of the front and rear surfaces of the lens. The configuration of the lens thickness measuring section 400 is basically the same as that disclosed in Japanese Unexamined Patent Publication No. Hei. 3-20603 and U.S. Pat. No. 5,333,412 filed by or assigned to the present assignee, which are referred to for details of the lens thickness measuring section 400. A difference from that disclosed in Japanese publication 3-20603 is that the lens thickness measuring section 400 of FIG. 7 is so controlled as to move in front-rear direction (indicated by arrows in FIG. 7) relative to the lens grinding apparatus by a front-rear moving means 630 based on edge processing data. The lens thickness is measured such that the measuring arm 527 is rotated upward from its lower initial position and the feelers 523 and 524 are respectively brought into contact with the front and rear refraction surfaces of the lens. Therefore, it is preferable that the rotary shaft of the measuring arm 527 be equipped with a coil spring or the like which cancels out the downward load of-the measuring arm 527.

The lens thickness (edge thickness) measurement is performed in the following manner. The measuring arm 527 is rotated, that is elevated, so that the feeler 523 is brought into contact with the lens front refraction surface. While keeping the feeler 523 in contact with the lens front refraction surface, the lens is rotated as well as the lens thickness measuring section 400 is controlled to move forward or backward by the front-rear moving means 630, so that the shape of the lens front refraction surface (on the edge of the lens to be formed) is obtained. Then, the shape of the lens rear refraction surface (on the edge of the lens to be formed) is obtained similarly by rotating the lens and by moving the lens thickness measurement section 400 while keeping the feeler 524 in contact with the lens rear refraction surface. Based on the shapes of the lens front and rear refraction surfaces, the lens thickness (edge thickness) is obtained.

<Control System>

Figure 8:
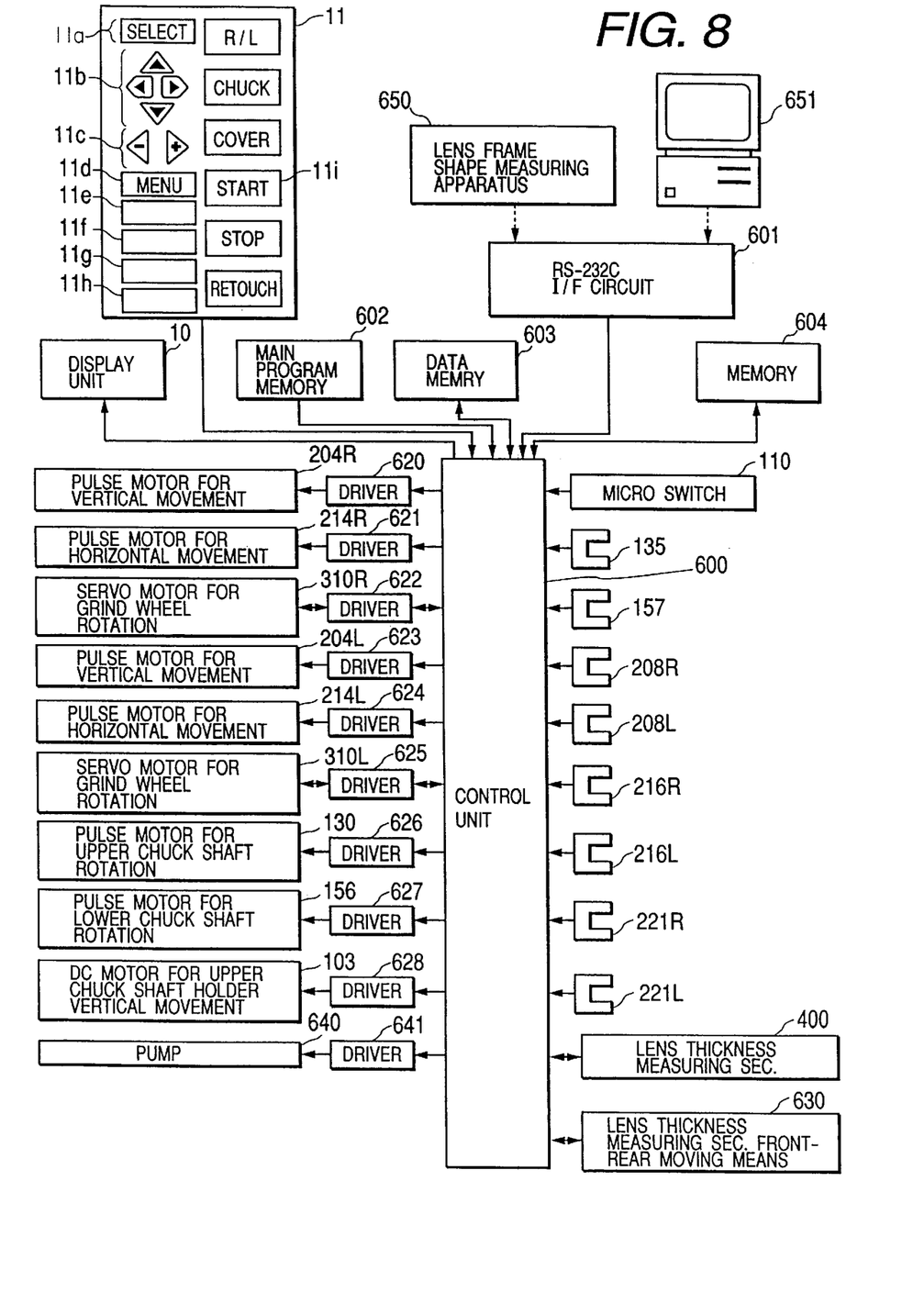
FIG. 8 is a schematic block diagram showing a control system of the apparatus.

FIG. 8 is a block diagram showing a general configuration of a control system of the lens grinding apparatus. Reference character 600 denotes a control unit which controls the whole apparatus. The display unit 10, input unit 11, micro switch 110, and photosensors are connected to the control unit 600. The input section 11 has various switches including a switch 11*a* used, for instance, to change input type when the layout data are input, a switch 11*b* for moving a cursor displayed on the display unit 10, a switch 11*c* used to input numerical values, a switch 11*d* for changing the displayed screen, a switch 11*e* for inputting material of the lens to be processed (glass, plastic or polycarbonate), a switch 11*f* for inputting processing mode (auto-bevel processing, forcible-bevel processing, or plane-processing), a switch 11*g* for designating whether or not chamfering process is performed, a switch 11*h* for designating whether or not mirror-polishing process is performed, and a switch 11*i* for starting processing.

The motors for moving or rotating the respective parts are connected to the control unit 600 via drivers 620–628. The drivers 622 and 625, which are respectively connected to the servo motor 310R for the right lens grinding part 300R and the servo motor 310L for the left lens grinding part 300L, detect the torque of the servo motors 310R and 310L during the processing and feed back the detected torque to the control unit 600. The control unit 600 uses the torque information to control the movement of the lens grinding parts 300R and 300L as well as the rotation of the lens. Reference numeral 640 designates a fluid (water) supply pump which supplies grinding fluid (water) to the nozzles 170, and 641 is a driver therefor.

Figure 9:
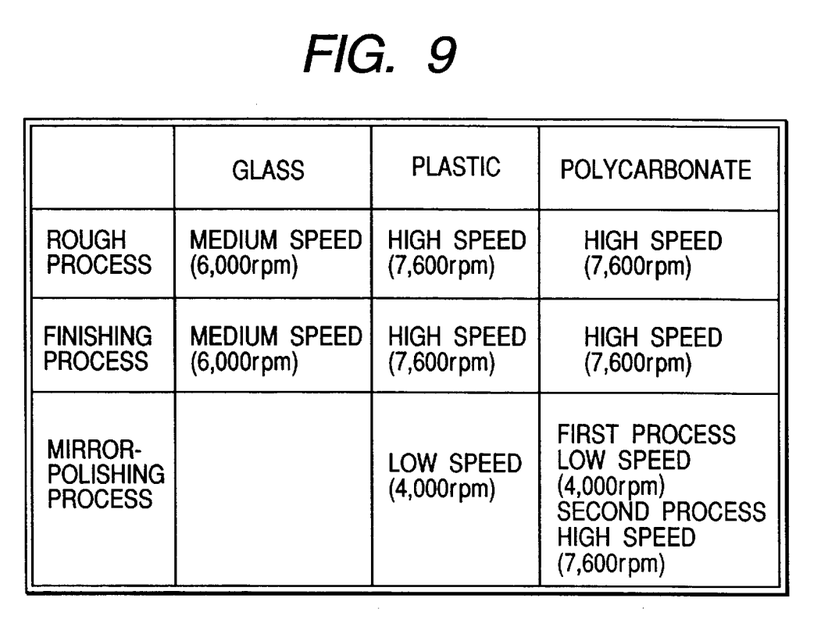
FIG. 9 is a view showing an example of information which is to be stored in a memory and which relates to rotational speeds of grinding wheels corresponding to the material of a lens and process stages.

Reference numeral 601 denotes an interface circuit which serves to transmit and receive data. An eyeglass frame shape measuring apparatus 650 (see U.S. Pat. No. 5,333,412), a host computer 651 for managing lens processing data, a bar code scanner 652, etc. may be connected to the interface circuit 601. A main program memory 602 stores a program for operating the lens grinding apparatus. A data memory 603 stores data that are supplied through the interface circuit 601, lens thickness measurement data, and other data. An adjusting value memory 604 stores information about rotational speeds of the grinding wheels in relation to the lens materials and the processing stages as shown in FIG. 9.

Operation

The operation of the thus configured apparatus will be described. The optician inputs frame data measured by the lens frame shape measuring apparatus 650, into the main unit of the apparatus via the interface circuit 601. The input data are transferred to and stored into the data memory 603. The lens shape based on the frame data is displayed on the display unit 10. Therefore, the optician inputs layout data such as the PD value of the user, the FPD value, and the height of the optical center through the switches 11*a*, 11*b*, and 11*c*, and process conditions through the switches 11*d* to 11*h*. For example, polycarbonate is input as the material of the lens, an auto bevel process is input as the process mode, and a mirror-polishing process is input. As a result of these inputs, information of rotational speeds of the grinding wheels in process stages for polycarbonate is read out from the adjusting value memory 604.

After the process conditions are input, the subject lens which has undergone predetermined processes is chucked by the chuck shafts 121 and 152, and the start switch 11*i* is depressed to operate the apparatus. Upon receipt of the start signal, the control unit 600 drives the lens thickness measuring section 400 and the front-rear moving means 630 and obtains edge position information based on the frame data and the layout data. On the basis of the obtained edge position information, bevel path data which are to be applied to the lens are then obtained in accordance with predetermined programs. As for the calculation of the bevel path data, there are proposed several methods including a method in which a curve is calculated from front and rear surface curves, a method in which the edge thickness is divided, and a combination of these methods. For the details of the calculation, reference is made to, for example, the commonly assigned U.S. Pat. No. 5,347,762. When the bevel path data are obtained, processing data which have been converted as data of the axis-to-axis distance between the rotation shaft of the lens and that of the grinding wheel for processing the lens. The processing data are stored in the data memory 603.

Next, the control unit 600 controls the apparatus so as to perform the rough process on the basis of the processing data. The control unit 600 drives the servo motor 310R to rotate the group of grinding wheels of the lens grinding part 300R. Since polycarbonate is input as the material of the lens, the grinding wheel group is rotated at a high speed (7,600 rpm) in accordance with the information FIG. 9. Furthermore, the control unit 600 drives the pulse motor 204R to lower the vertical slide base 210 so that the rough grinding wheel 30 is located at the same height as the subject lens. Then, the pulse motor 214R is rotated so as to slide the lens grinding part 300R toward the subject lens, and the upper and lower pulse motors 130 and 156 are synchronously rotated so that the subject lens chucked by the chuck shafts 121 and 152 are rotated. The rough grinding wheel 30 is moved toward the subject lens, thereby gradually grinding the subject lens.

When the rough process is ended, the process advances to a finishing process using the finishing grinding wheel 31. In the finishing process, since the mirror-polishing process is to be performed later, the control unit 600 reads bevel processing data from the data memory 603, and calculates size-corrected finishing processing data in which a processing margin a is added to the above-mentioned bevel path data in order to leave the processing margin a for the mirror-polishing process (this calculation is performed after the above-mentioned calculation of the bevel). Based on the size-corrected finishing processing data, the control unit 600 controls the finishing grinding wheel 31 so that the bevel groove of the wheel is located at the height of the intended bevel of the lens. Thereafter, the control unit drives the motor 214R so as to move the finishing grinding wheel 31 toward the lens, thereby processing the lens while rotating the lens. In this process also, the control unit 600 drives the grinding wheel group so as to rotate at a high speed. In the case of a polycarbonate lens, the above-mentioned rough and finishing processes are performed without supplying the grinding fluid.

Next, the process advances to the mirror-polishing process. The mirror-polishing process for a polycarbonate lens is divided into a first process stage which is performed at a low rotational speed (4,000 rpm) of the grinding wheel while stopping the supply of the grinding fluid, and a second process stage which is thereafter performed at a high rotational speed of the grinding wheel while supplying the grinding fluid, thereby glossing the process face.

The control unit 600 returns the grinding wheel group of the lens grinding part 300R to the initial position, and, based on the process data stored in the data memory 603, then controls the lens grinding part 300L so that the bevel groove of the mirror-polishing grinding wheel 34 of the lens grinding part 300L is located at the height of the intended bevel of the lens. Thereafter, the mirror-polishing process is performed by moving the mirror-polishing grinding wheel 34 while rotating the subject lens on the basis of the process data. In the first process stage of the mirror-polishing process, the grinding fluid is not supplied and the mirror-polishing grinding wheel 34 is rotated at a low rotational speed (4,000 rpm). If the mirror-polishing grinding wheel 34 is rotated in this stage at a high rotational speed as in the case of the rough and finishing processes, grinding heat is excessively generated and the process face melts (this phenomenon occurs more easily as the diameter of the grinding wheel is smaller). Since the rotational speed is set to be substantially one half of that in the rough and finishing processes, the process face does not melt. In the first process stage, the subject lens makes three rotations. As a result, the subject lens is ground by an amount which is substantially equal to the processing margin.

When the first process-stage of the mirror-polishing process is ended, the control unit 600 drives the fluid supply pump 640 to start the supply of the grinding fluid from the fluid supply nozzle 170, and drives the mirror-polishing grinding wheel 34 so as to again rotate at a high speed (7,600 rpm). Then, the second process stage is performed while moving the mirror-polishing grinding wheel 34 on the basis of the process data. In the process of a polycarbonate lens, the heat generated in the process face can be removed by supplying the grinding fluid and hence a glossy process face is enabled. When the rotational speed of the mirror-polishing grinding wheel 34 is low (4,000 rpm), the friction heat in the process face is deficiently generated and hence the process face is not sufficiently softened. As a result, the process face cannot be processed. When the rotational speed of the mirror-polishing grinding wheel 34 is high (7,600 rpm), the process face is appropriately softened so as to be ground, and becomes glossy. After the subject lens makes two rotations, the second process stage is ended.

In the case where the subject lens is made of plastics and the mirror-polishing process is to be performed, information of the grinding wheel rotational speed for a plastic lens is read out. In the same manner as described above, the rough process is performed while rotating the rough grinding wheel 30 at a high speed, and also the finishing process is performed while rotating the finishing grinding wheel 31 at a high speed. In the mirror-polishing process, the mirror-polishing grinding wheel 34 is rotated at a low speed, whereby burning and hardening of the lens process face due to excessive grinding heat in the process can be suppressed. As a result, the face can be formed into an excellent mirror finished face.

In the case where the subject lens is made of glass, when the material is input, information of the grinding wheel rotational speed for a glass lens is read out. In both the rough and finishing processes, the rough grinding wheel 37 and the finishing grinding wheel 31 are set to be rotated at a medium speed (6,000 rpm) as shown in FIG. 9. This can prevent a crack and break of the lens due to excessive grinding heat from occurring, and allow the process to be performed while ensuring the process ability.

Figure 10:
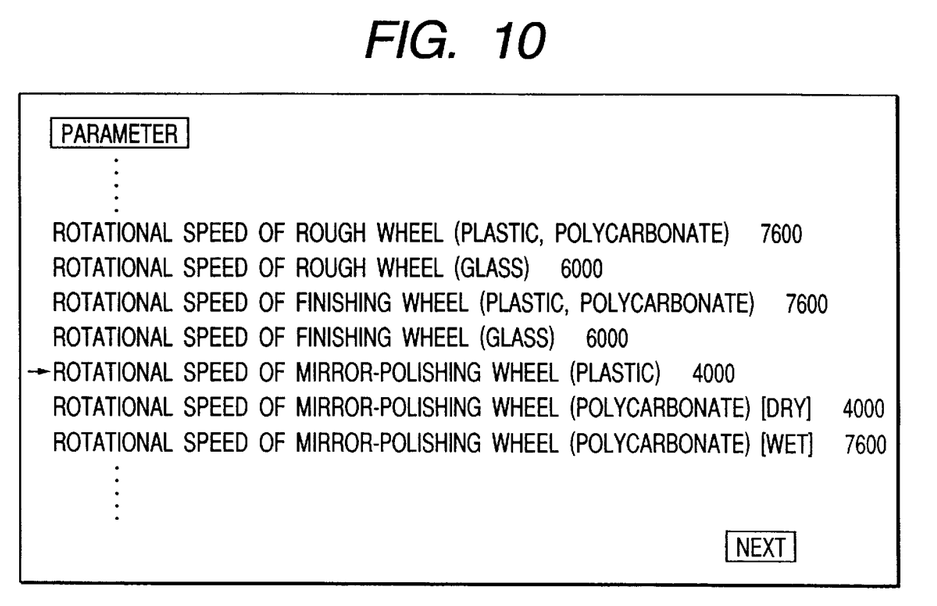
FIG. 10 a view showing an example of a screen in the case where rotational speeds of grinding wheels corresponding to the material of a lens and process conditions are to be set.

The rotational speeds of the grinding wheels are set so that the process performance of each grinding wheel is adequately exhibited in accordance with the performance of the corresponding motor, the grain size of the grinding wheel (in the embodiment, a rough grinding wheel for processing a lens of plastics, polycarbonate, or an acrylic resin is #60, a rough grinding wheel for a glass lens is #120, a finishing grinding wheel is #400, a mirror-polishing grinding wheel is #3000), the material of the lens, the process conditions, and the like. The setting of the rotational speed of each grinding wheel can be changed in the following manner. The switch 11d is operated so that a parameter setting screen is displayed. As shown in FIG. 10, on the screen of the display unit 10, displayed are parameter items for adjusting the size in each process, and those for adjusting the rotational speed of each grinding wheel in accordance with the processing condition and the material of the lens. When the setting of one of the parameters is to be changed, an arrow cursor 701 displayed in the left side is vertically moved by operating the switch 11b to select the item which is to be changed. The set value of the selected item is changed by operating the switch 11c so as to increase or decrease the value displayed on the right side of the item. When the mirror-polishing process is to be performed on a conventional plastic lens called CR-39 which is in contrast to a high-refractive plastic lens, for example, the arrow cursor 701 is placed on the item "rotational speed of mirror-polishing wheel (plastic)" shown in FIG. 10 and the value (rotational speed) on the right side is changed from 4,000 to 6,000 (rpm). As compared with a high-refractive plastic lens, in a CR-39 plastic lens, the process surface is less burned. When the process is performed at a slightly increased rotational speed of the mirror-polishing grinding wheel, therefore, it is possible to obtain a process face of an excellent quality while shortening the processing time period. When the parameter setting screen is closed, the data stored in the adjusting value memory 604 are updated.

As described above, according to the invention, since the rotational speed of each grinding wheel is controlled in accordance with the material of the subject lens and the process stage, the processing time period can be shortened and the quality of the process face can be improved, so that an appropriate grinding process can be performed.

What is claimed is:

1. An eyeglass lens grinding apparatus for grinding an eyeglass lens so that said lens fits into an eyeglass frame, said apparatus comprising:

inputting means for inputting at least one of a process condition of said lens and a material of said lens as a lens processing information;

grinding wheel rotating means for rotating a grinding wheel for grinding the subject lens, at a variable rotational speed;

parameter storing means for storing a plurality of grinding wheel rotational speeds for a plurality of lens processing conditions and/or kinds of lens materials; and process controlling means for reading out, from the parameter storing means, a grinding wheel rotational speed adapted to the lens processing information inputted by the input means, thereby controlling the grinding wheel rotating means.

2. An eyeglass lens grinding apparatus as set forth in claim 1, wherein said grinding wheel rotating means has a rough grinding wheel, a finishing grinding wheel, and a mirror-polishing grinding wheel, and, when a condition of a mirror-polishing process is input as the lens processing information by the input means, said process controlling means reads out a grinding wheel rotational speed for the mirror-polishing, which is slower than a grinding wheel rotational speed for at least one of a rough grinding and a finishing, thereby controlling the grinding wheel rotating means to perform the mirror polishing.

3. An eyeglass lens grinding apparatus as set forth in claim 1, further comprising:

grinding fluid supplying means for supplying a grinding fluid to a process face of said lens;

wherein said grinding wheel rotating means has a rough grinding wheel, a finishing grinding wheel, and a mirror-polishing grinding wheel, and, when a polycarbonate material and a mirror-polishing process are input as the lens processing information by the input means, said process controlling means reads out a first grinding wheel rotational speed by which the lens that has been subjected to the finishing is subjected to a first mirror-polishing process without a supply of grinding fluid, and further reads out a second grinding wheel rotational speed which is faster than the first grinding wheel rotational speed, by which the lens that has been subjected to the first mirror-polishing process is subjected to a second mirror-polishing process with a supply of grinding fluid, thereby sequentially performing the first and second mirror-polishing process.

4. An eyeglass lens grinding apparatus as set forth in claim 1, wherein the parameter storing means stores a first grinding wheel rotational speed for a rough process and a finishing process for a glass material lens, and a second grinding wheel rotational speed, which is faster than the first grinding wheel rotational speed, for the rough process and the finishing process for a plastic material lens.

5. An eyeglass lens grinding apparatus as set forth in claim 3, wherein said process controlling means reads out a third grinding wheel rotational speed, which is substantially equal to the second grinding wheel rotational speed, thereby controlling said grinding wheel rotating means to sequentially perform a rough process and a finishing process.

6. An eyeglass lens grinding apparatus as set forth in claim 3, wherein said first rotational speed is substantially one half of said second rotational speed.

7. An eyeglass lens grinding apparatus as set forth in claim 4, wherein the parameter storing means further stores a third grinding wheel rotational speed, which is substantially equal to the second grinding wheel rotational speed, for the rough process and the finishing process for a polycarbonate material lens.

8. A method of grinding an eyeglass lens so that said lens fits into an eyeglass frame, comprising:

a first step of inputting a material of said lens;

a second step of inputting a process condition of said lens; and a third step of processing said lens while changing a rotational speed of a grinding wheel for grinding said lens, on the basis of the input of the first step or the second step.

9. A method of grinding an eyeglass lens as set forth in claim 8, wherein when a polycarbonate material is input in said first step and a condition of a mirror-polishing process is input in said second step, said third step includes:

a fourth step of performing a rough process on said lens while rotating a rough grinding wheel at a first rotational speed;

a fifth step of performing a finishing process on said lens which has undergone said rough process, while rotating a finishing grinding wheel at a second rotational speed;

a sixth step of performing a mirror-polishing process on said lens which has undergone said finishing process, while rotating a mirror-polishing grinding wheel at a third rotational speed; and a seventh step of performing a mirror-polishing process on said lens which has undergone the process of said sixth step, while rotating said mirror-polishing grinding wheel at a fourth rotational speed and supplying a grinding fluid, and wherein said third rotational speed is lower than each of said first, second, and fourth rotational speeds.

* * * * *